United States Patent [19]

Frehn

[11] 3,819,364

[45] June 25, 1974

[54] WELDING HARD METAL COMPOSITION

[75] Inventor: Fritz Frehn, Krefeld, Germany

[73] Assignee: Deutsche Edelstahlwerke GmbH, Krefeld, Germany

[22] Filed: Sept. 29, 1972

[21] Appl. No.: 293,404

[30] Foreign Application Priority Data
Oct. 6, 1971   Germany............................ 2149772

[52] U.S. Cl................. 75/122, 29/182.7, 148/31, 75/126 R
[51] Int. Cl........................... C22c 37/00, B22t 3/00
[58] Field of Search ................. 75/126, 126 P, 122; 148/31; 29/182.7, 182.8

[56] References Cited
UNITED STATES PATENTS

| | | | |
|---|---|---|---|
| 2,185,618 | 1/1940 | Welch............................... | 75/126 C |
| 2,590,835 | 4/1952 | Kirkby.............................. | 75/126 P |
| 2,798,805 | 7/1957 | Hodge.............................. | 75/126 P |
| 2,835,571 | 5/1958 | Smith............................... | 75/126 P |
| 2,986,463 | 5/1961 | Dulis................................ | 75/126 C |
| 3,044,872 | 7/1962 | Hayes............................... | 75/126 C |
| 3,149,411 | 9/1964 | Smiley.............................. | 29/182.8 |
| 3,165,400 | 1/1965 | Roy.................................. | 75/126 C |
| 3,183,127 | 5/1965 | Gregory............................ | 148/31 |
| 3,380,861 | 4/1968 | Frehn............................... | 148/31 |
| 3,653,982 | 4/1972 | Prill................................. | 29/182.7 |
| 3,725,016 | 4/1973 | Mal.................................. | 29/182.8 |

*Primary Examiner*—Hyland Bizot
*Attorney, Agent, or Firm*—Kenyon & Kenyon Reilly Carr & Chapin

[57] ABSTRACT

A welding hard metal composition comprising a hardenable or hardened steel matrix bonding metal carbide particles, has a composition making it particularly adapted for deposition on steel and particularly on a hard metal composition of metal carbide particles bonded by a steel matrix.

4 Claims, No Drawings

WELDING HARD METAL COMPOSITION

BACKGROUND OF THE INVENTION

Hard metal compositions of the type comprising one or more metal carbides in particle form bonded by a matrix of heat treatable or hardenable steel may be used for tools and other articles requiring high hardness.

To attach such an article to a steel member, for example, welding techniques are desirable. When used, the welding metal should be compatible with both the hard metal composition article and the steel member.

Articles made of such hard metal compositions may require repair, and here again welding techniques are desirable providing the welding metal is compatible with the article being repaired and its intended use.

The use of such hard metal compositions for the hard facing of steel surfaces whether or not formed by hardenable steel, is desirable to provide such surfaces with a high surface hardness, for example, to enhance resistance to wear. Here again any such welding material used to form the hard face should be compatible with the steel base which is hard surfaced.

DESCRIPTION OF THE PRIOR ART

Prior art hard metal welding compositions are in general not suitable for such applications, particularly when the metal composition on which the weld deposit is made comprises a heat treatable or hardenable steel matrix bonding metal carbide particles. A heat treatable steel should be capable of being either hardened or softened by appropriate heat treating techniques. To avoid thermal cracking problems, the welding metal composition should have a thermal expansion coefficient substantially or approximately that of the steel base to which the welding metal is applied, but this has not heretofore been the case.

Obviously electric welding techniques are indicated, and the prior art has suggested the use of thin tubes of mild steel or nickel filled with particles of tungsten or other hard metal carbides. Sintered electrodes having a chromium or tungsten carbide base with metallic binders such as iron, cobalt, and nickel have been suggested.

When the welding metal composition is applied to any hardenable steel base, it is obvious that when heat treatment is used to harden the steel base the weld metal should also be hardenable, but this is not so in the case of the above suggestions.

Unsuccessful experiments have been attempted in the direction of welding articles made of hard metal composition of the known compositions comprising hard carbide particles bonded by a heat treatable or hardenable steel matrix, by electric welding techniques using electrodes made of the same type of materials. Up to the present time such attempts have been unsuccessful insofar as is known. The metal carbide components decompose at the welding temperatures required, so the resulting weld metal consists substantially only of the original steel matrix and obviously cannot provide the desired hardness and resistance to wear.

SUMMARY OF THE INVENTION

The object of the present invention is to provide a welding material, such as an electric welding electrode, which when deposited as a weld contains an effective amount of hard metal carbides in a matrix of heat treatable or hardenable steel and which is applicable for deposition on a base comprising steel, particularly a heat treatable or hardenable steel, whether composed entirely of steel or of a heat treatable steel matrix bonding hard metal carbides.

According to the invention, this object is attained by a hard metal composition containing particles of titanium carbide either alone or mixed with other hard metal carbides and bonded by a heat treatable or hardenable ferritic-martensitic steel of the following analysis, in which the balance is iron:

0.25 to 1.50 percent by weight of C
0.8 to 3.0 percent by weight of Mn
1.5 to 20.0 percent by weight of Cr
1.0 to 6.0 percent by weight of Mo
0.001 to 0.1 percent by weight of B In addition to the above, the steel may include the following:

0 to 3.0 percent by weight of Cu
0 to 1.5 percent by weight of Nb
0 to 1.2 percent by weight of Si
0 to 6.0 percent by weight of Co
0 to 3.0 percent by weight of Ni
0 to 3.0 percent by weight of Al
0 to 3.0 percent by weight of Ti
0 to 1.4 percent by weight of V In all instances the composition may include residual elements or compounds which cannot be eliminated in any practical manner providing these are not included in amounts appreciably affecting the characteristics of the welding composition which would exist in their absence.

DESCRIPTION OF THE PREFERRED EMBODIMENT

The foregoing object is achieved, particularly in the case of welding applications to the hard metal compositions of the type comprising a heat treatable or hardenable steel matrix bonding particles of hard metal carbides, by a sintered electric welding electrode or the like containing from 25 to 70 percent by weight of titanium carbide particles, up to 50 percent by weight of this carbide being replaceable by the carbides of chromium, tungsten, tantalum, and zirconium in particle form, this carbide alone or mixed with these other carbides in particle form being bonded by the new heat treatable or hardenable steel matrix, representing the balance or remainder of the overall welding composition, having in addition to iron the following composition:

0.25 to 1.50 percent by weight of C
0.8 to 3.0 percent by weight of Mn
1.5 to 20.0 percent by weight of Cr
1.0 to 6.0 percent by weight of Mo
0.001 to 0.1 percent by weight of B
0 to 3.0 percent by weight of Cu
0 to 1.5 percent by weight of Nb
0 to 1.2 percent by weight of Si
0 to 6.0 percent by weight of Co
0 to 3.0 percent by weight of Ni
0 to 3.0 percent by weight of Al
0 to 3.0 percent by weight of Ti
0 to 1.4 percent by weight of V However, the most preferred embodiment of the invention is with the described metal carbide content limited to from 65 to 68 percent by weight of titanium carbide alone and in the form of particles bonded by a steel matrix having the following composition:

0.4 to 0.6 percent by weight of C
0.5 to 0.9 percent by weight of Mn
8.0 to 15.5 percent by weight of Cr
1.5 to 3.5 percent by weight of Mo
0.5 to 0.9 percent by weight of Cu
0.001 to 0.01 percent by weight of B
0.1 to 0.5 percent by weight of V
0 to 0.3 percent by weight of Nb
0 to 1.5 percent by weight of Si
Remainder — Fe The manufacture of the new welding metal composition may be done by mixing the metal carbide or carbides and the steel matrix alloy in pulverized form, or by mixing their individual components in powder form and having an average grain size of from 6 to 10 microns, grinding under nonoxidizing fluids to a grain size of from 3 to 5 microns or finer and drying in a vacuum to obtain at least partial volatilization of the grinding fluid. Then, after an addition of pressing-facilitating mediums, the desired shape may be produced by a pressing operation or, alternately, after an addition of plasticizing mediums, welding electrode rods may be produced by the extrusion method. The resulting shapes are then vacuum dried and sintered in a vacuum furnace operation at pressures better than $10^{-2}$ torr and a temperature of from 1,250° to 1,450°C. This is followed by a heat treatment under vacuum for 1 hour at 1000°C, resulting in hardness of from 45 to 48 Rockwell C. Any skin present may be removed by centerless grinding, the shapes produced usually being in the form of welding electrode rods.

By heating the new composition to from 980° to 1,100°C, either in air, a vacuum, or inert gases, the cooling being at a suitable rate, the above hardness can be increased to from 58 to 70 Rockwell C. Tempering at temperature of from 490° to 520°C reduces the hardness. By adjusting the steel matrix components contributing to the hardenability of the matrix, suitable heat treatment can produce a hardness as high as 80 Rockwell C.

It follows from the above that the new welding hard metal composition can be used for hard facing or hard surfacing a steel part or article when made into electric welding electrodes. These electrodes are suitable when appropriately sheathed for normal electric welding by either DC or AC electric currents; however, the electric plasma-arc welding process is considered preferable because of its good flow of argon gas.

When the new welding metal is applied to a base metal in its relatively softer forms, it may be machined by the use of suitable cutting tools, this producing chips of the alloy. When these chips are ground to a particle size in the area of 3 microns or less, they may be made into electrodes or other forms by resorting to normal powder metallurgical practices. If the chips are reduced to a grain size of from 0.04 to 0.08 mm they are useful in connection with the plasma spraying technique.

The practical use of the present invention is shown by various examples as follows:

EXAMPLE 1

In accordance with the powder-metallurgy pressing and sintering process previously suggested, a naked welding electrode of 3.0 mm diameter and 200 mm length, was produced, having the following composition:

34.5 percent by weight of TiC, and 65.5 percent by weight of a steel matrix having the following composition:

0.55 percent by weight of C
10.00 percent by weight of Cr
3.00 percent by weight of Mo
0.80 percent by weight of Cu
0.01 percent by weight of B
0.6 percent by weight of Mn
0.1 percent by weight of V
Remainder — Fe With this welding electrode, and using an argon-arc welding apparatus and a current of 130 amperes, and an increased normal flow and also lateral flow of argon to avoid oxidation, welding beads more than about 3 mm in thickness were produced repeatedly upon a hardenable alloy containing hard substances and of the following composition:

33.0 percent by weight TiC and 67 percent by weight of a steel matrix composed as follows:

0.45 percent by weight of C
3.00 percent by weight of Cr
3.00 percent by weight of Mo
1.50 percent by weight of Cu
0.02 percent by weight of B
Remainder — Fe This above composition had a hardness of 70 Rockwell C.

After the welding and air-cooling, a hardness of 66/67 Rockwell C was measured in the weld bead. This hardness had also been assumed by the base material, because it did not withstand annealing, and also it could not reharden in air. The hardness figures however show that by means of a welding electrode of the invention it is possible to improve hardened tools made of similar hardenable alloys containing hard substances without a great loss of hardness. The decisive thing however is that no cracks become visible either in or outside the weld bead. For smoothing the surface of the weld bead, produced as described, it must be machined with grinding wheels.

When large pieces break out of a tool, or out of a part subjected to wear, and have to be repaired by welding, then for the purpose of smoothing the surfaces it is often necessary to employ a chip-removing process through planing, milling, turning or the like. For this purpose the piece of work, together with the weld, may be annealed at 1,000°C to a machinable hardness of 45/46 Rockwell C. After the chip-removing operation, a rehardening may be effected by means of an austenitizing vacuum heating at 1,050°C, with a following cooling by nitrogen, under subnormal pressure. Workpieces and machined weld beads, after annealing at 150°C for 1 hour, have a hardness of 68/69 Rockwell C. No formation of cracks occurs.

EXAMPLE 2

On a part subjected to wear and made of hardened so-called 12 percent chromium tool steel having a hardness of 62 Rockwell C and of the following composition:

2.0 % C
0.25% Si
0.35% Mn
11.15% Cr

Remainder — Fe
and using an electrode in accordance with the invention, which consisted of 34.5 percent by weight of titanium carbide and 65.5 percent by weight of a steel matrix composed as follows:

0.55 % C
10.00 % Cr
3.00 % Mo
0.80 % Cu
0.01 % B
0.60 % Mn
0.10 % V
Remainder Fe there were welded on a number of weld beads of about 3 mm thickness as a wear-resisting or hard surface layer. Without any after-treatment whatever, the layer, applied by argon-arc welding, and in accordance with the invention, showed a hardness of 67/69 Rockwell C while on the hardened steel part a hardness of 60/61 Rockwell C was measured.

EXAMPLE 3

On a nonhardenable plain structural steel, by means of an electrode according to the invention, there were deposited by argon-arc welding a number of layers in order to obtain great resistance to wear or high surface hardness and having the following composition:

55 percent by weight if titanium carbide and 45 percent by 45% by weight of a steel matrix composed of:

0.55 % C
0.90 % Mn
3.00 % Mo
13.50 % Cr
0.80 % Cu
0.02 % B
0.50 % V
Remainder — Fe.

After the conclusion of the welding there was measured on the welded layer a hardness of 72/74 Rockwell C, obtained solely through air-hardening of the welding electrode deposit which was then tempered to 54/55 Rockwell C. The structural steel had a hardness of only less than 10 Rockwell C. No formation of cracks could be seen either at the transition area between the steel and the weld bead, or in the weld itself.

A following annealing, for one hour at 1,000°C and 6 hours at 720°C brought the weld to a machinable hardness of 54/55 Rockwell C, which after rehardening, by cooling down from a 1,050°C austenitizing temperature in a bath at 510°C, gave a hardness of 75/77 Rockwell C, and thus greater wear-resisting hardness.

Because the expansion coefficient of the welding composition according to the invention is 9.5 to 10.0 $\times 10^{-6}$ m/m°C in the temperature range from 20° to 750°C and thus close to that of steel, it is possible to weld parts or articles, or to apply coating layers on hard metal compositions, and to heat treat, without formation of cracks, when these compositions have a hardenable steel matrix bonding metal carbide particles. Of course, steel in general may also be welded.

Possibilities for the application of welding in accordance with the invention are the repair-welding of expensive tools made of hardenable alloys of hard substances, of tool steels, and the armoring of soft structural steels subjected to great wear.

As a replacement for titanium carbide, the carbides of vanadium and molybdenum may also be used up to the amounts described, such as 50 percent by weight of the titanium carbide.

What is claimed is:

1. A hard metal composition consisting essentially of from 25 to 70 percent by weight of particles of at least one metal carbide bonded together by a heat treatable steel matrix; said matrix forming the balance of said composition and having a composition consisting essentially of:

0.25 to 1.50 percent by weight of C
0.8 to 3.0 percent by weight of Mn
1.5 to 20.0 percent by weight of Cr
1.0 to 6.0 percent by weight of Mo
0.001 to 0.1 percent by weight of B
0 to 3.0 percent by weight of Cu
0 to 1.5 percent by weight of Nb
0 to 1.2 percent by weight of Si
0 to 6.0 percent by weight of Co
0 to 3.0 percent by weight of Ni
0 to 3.0 percent by weight of Al
0 to 3.0 percent by weight of Ti
0 to 1.4 percent by weight of V
Remainder — Fe 2. The composition of claim 1 in which said matrix has a composition consisting essentially of:

0.4 to 0.6 percent by weight of C
0.5 to 0.9 percent by weight of Mn
8.0 to 15.5 percent by weight of Cr
1.5 to 3.5 percent by weight of Mo
0.5 to 0.9 percent by weight of Cu
0.001 to 0.01 percent by weight of B
0.1 to 0.5 percent by weight of V
0 to 0.3 percent by weight of Nb
0 to 1.5 percent by weight of Si
Remainder — Fe 3. The composition of claim 1 in which by weight at least 50 percent of said particles are particles of titanium carbide with any balance of said particles selected from the class consisting of particles of carbides of titanium, chromium, vanadium, molybdenum, tungsten, tantalum, and zirconium.

4. The composition of claim 2 in which said particles are by weight from 32 to 35 percent titanium carbide particles with the balance of the alloy being said matrix.

* * * * *